United States Patent [19]

Bravet et al.

[11] Patent Number: 4,783,344
[45] Date of Patent: Nov. 8, 1988

[54] PROCESS AND DEVICE FOR SPRAYING A REACTION MIXTURE CAPABLE OF FORMING A TRANSPARENT PROTECTIVE LAYER OF HIGH OPTICAL QUALITY

[75] Inventors: Jean-Louis Bravet, Thourotte; Francois Toytot, Thourotte; Gerd Leyens, Aachen; Siegfried Pikhardt, Roetgen; Herbert Bayer, Aachen, all of France

[73] Assignee: Saint-Gobain Vitrage, Courbevoie, France

[21] Appl. No.: 4,240

[22] Filed: Jan. 2, 1987

Related U.S. Application Data

[63] Continuation of Ser. No. 729,572, May 2, 1985, abandoned.

[30] Foreign Application Priority Data

May 2, 1984 [FR] France .................. 84 06783

[51] Int. Cl.4 .............................................. B05D 1/04
[52] U.S. Cl. ......................................... 427/31; 427/164; 427/168; 427/316; 427/421; 427/426
[58] Field of Search ................. 427/31, 164, 168, 316, 427/421, 426

[56] References Cited

U.S. PATENT DOCUMENTS

| 3,147,137 | 9/1964 | Glass | 427/31 |
| 3,307,789 | 3/1967 | Clark | 427/426 |

FOREIGN PATENT DOCUMENTS

| 0054491 | 6/1982 | European Pat. Off. . |
| 2134255 | 9/1973 | France . |
| 2187719 | 2/1974 | France . |
| 22516087 | 7/1975 | France . |
| 2398606 | 3/1979 | France . |

OTHER PUBLICATIONS

Tholome, Industrial Finishing, Nov. 1977, pp. 30–35.

Primary Examiner—Richard Bueker
Attorney, Agent, or Firm—Oblon, Fisher, Spivak, McClelland & Maier

[57] ABSTRACT

A process for coating a transparent article of high optical quality, which comprises spraying a polymerizable reaction mixture of reaction components on the transparent article to form a homogenous coating layer of high optical quality, wherein the mixture of reaction components is sprayed by high-speed centrifugal spraying; and polymerizing the resultant coating layer.

9 Claims, 3 Drawing Sheets

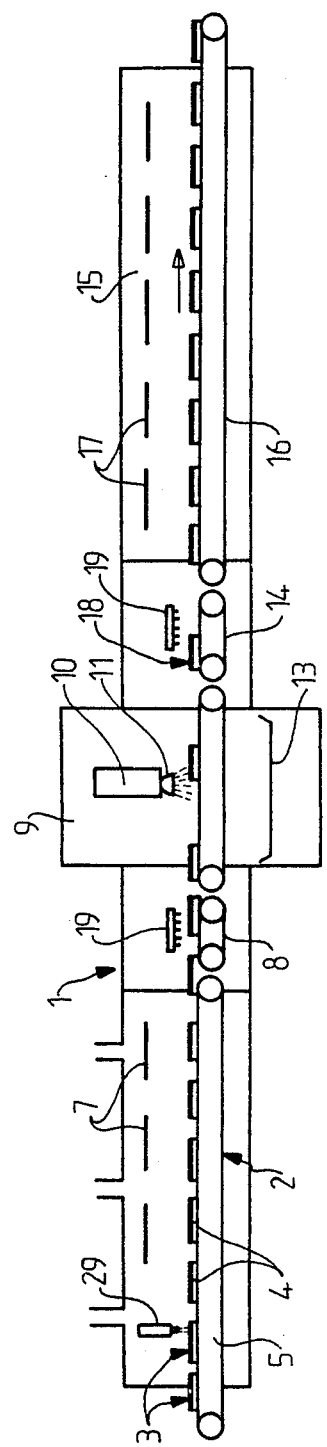
FIG_3

PROCESS AND DEVICE FOR SPRAYING A REACTION MIXTURE CAPABLE OF FORMING A TRANSPARENT PROTECTIVE LAYER OF HIGH OPTICAL QUALITY

This application is a continuation of application Ser. No. 729,572 filed May 2, 1985, now abandoned.

BACKGROUND OF THE INVENTION

1. Field of the Invention:

The present invention relates to a process and a device for coating a transparent article by spraying thereon a mixture of components capable of forming a protective layer of high optical quality.

2. Dscription of the Background:

Transparent articles, particularly glasses, provided with a plastic protective layer have been described in numerous publications. For example, French patent Nos. 2,251,608 and 2,316,913 describe glasses formed from a glass support coated with a plastic layer exhibiting antilaceration properties, and so-called surface properties, in particular resistance to scoring or scratching and abrasion. French patent No. 2,230,563 describes articles of high optical quality formed by a plastic support coated with the same plastic layer having properties of resistance to scoring and abrasion.

The protective layer used in the various applications is essentially made up of a thermosetting polyurethane and can be produced by reactive casting of a mixture of components capable of forming polyurethane on a plane support, this layer then being assembled by gluing to the article to be coated.

The layer can also be formed, when the article is prepared, by casting directly onto the article or by immersing the article in a bath containing the reaction mixture, or also by spraying the reaction mixture onto the article. But in this case, spraying with spray guns is not entirely satisfactory. This type of spraying generally does not provide a layer of homogeneous thickness and of good optical quality, free of orange peel, because of the differences in viscosity of the components forming the reaction mixture which is to be sprayed. Moreover, these differences cannot be attenuated by using a solvent because the solvent latter is often incompatible with the plastic to be coated, for example, polycarbonate, and can also cause harmful effects during production of the layer.

Therefore, a need continues to exist for a process and a device for coating treansparent articles in such a manner that the transparent article is coated with a protective layer of high optical quality.

SUMMARY OF THE INVENTION

Accordingly, it is an object of the present invention to provide a process for coating a transparent article with a protective coating of high optical quality.

It is also an object of this invention to provide a process for coating, in particular, a glass article with a glass or plastic of high optical quality.

Moreover, it is also an object of the present invention to provide a device for coating the transparent article with a protective coating of high optical quality.

According to the present invention, the foregoing and other objects are attained by providing a process for coating a transparent article of high optical quality which entails spraying a polymerizable mixture of reaction components on the transparent article to form a homogeneous coating layer thereon of high optical quality, wherein the mixture of reaction components is sprayed by high-speed centrifugal spraying; and then polymerizing resultant coating layer.

BRIEF DESCRIPTION OF THE DRAWINGS

FIG. 3 illustrates a line for coating glasses made of glass.

DETAILED DESCRIPTION OF THE PREFERRED EMBODIMENTS

Figure 1:
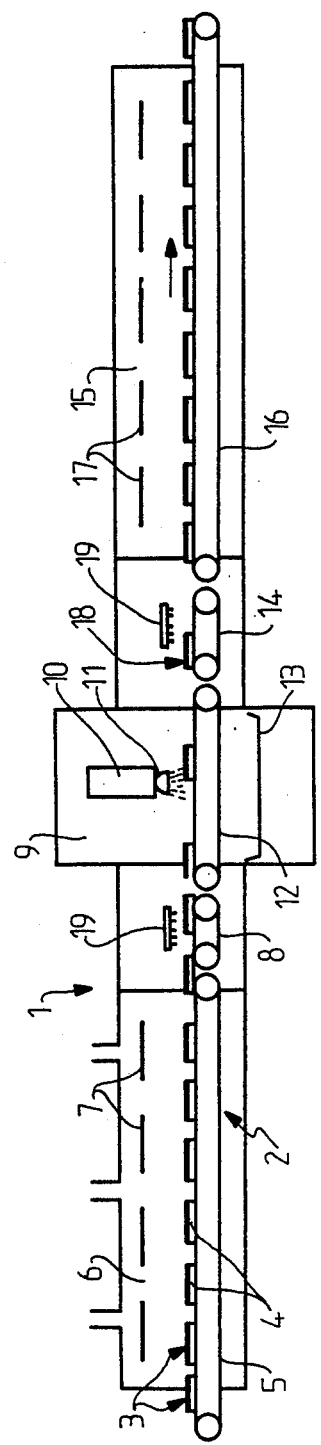
FIG. 1 diagrammatically represents a line for coating glasses with plastic.

The present invention relates to the prouction of transparent articles of high optical quality such as glasses for motor vehicles or buildings which entail a single-piece or laminated glass and/or plastic support coated on at least one of its faces with a plastic coating or protective layer. Additionally, the present invention also pertains to a device for coating the glass or plastic support by spraying a reaction mixture thereon which is capable of forming the protective layer.

The invention proposes a process for coating a transparent article, particularly a glass, with glass or plastic of high optical quality, by spraying of a polymerizable mixture of reaction components on the transparent article to form a homogeneous layer of high optical quality.

The term high optical quality, according to the invention, refers to the optical quality necessary for using a glass in the automobile industry, for example.

According to the invention, a mixture of polymerizable reaction components capable of forming the layer is sprayed on the article to be sprayed by high-speed centrifugal spraying and then the resulting coating layer is polymerized.

According to one aspect of the invention, the centrifugal spraying is performed with a spray head such as a bowl revolving at a speed between about 1000 and 80,000 rpm.

Advantageously, to avoid premature polymerization, the mixing is performed directly in the spray head.

Depending on the nature of the support to be coated, it may be necessary to perform a pretreatment of said support before coating it.

Thus, when the support is of plastic, for example, polycarbonate or polymethyl methacrylate, according to one aspect of the invention the support is heat-treated at a temperature between 60° and 120° C. for a sufficient time, on the order of 10 minutes to one hour, for example. This heat treatment improves the spreading of the layer during its formation.

When the support is of glass and optionally of plastic, according to another aspect of the invention, it is possible advantageously to pretreat this support chemically by coating its surface with an adhesion support such as an organosilane to improve the adhesion of the protective layer which is formed later.

According to another aspect of the invention, when the reaction mixture can polymerize under the action of heat, the spreading o the layer during forming is improved still further by spraying when the support to be coated is hot. Thus, when a thermosetting polyurethane layer is to be formed as described below, the best spreading is obtained when the support temperature is between about 25° C. and 60° C.

According to another aspect of the invention, the heat treatment of the support, when, for example, it is a polycarbonate, is preceded by cleansing the surface to be coated with alcohol. This cleansing with alcohol is intended to remove any trace of oil or other impurities on the support surface as a result of removal from the mold when the support is molded. This cleaning is essential when the support to be coated, of polycarbonate for example, is provided with silkscreened patterns or strips. This cleaning improves the later spreading of the sprayed layer still further. The alcohol used for the cleaning can, for example, be ethanol or isopropanol.

The polymerizable reaction mixture used for spraying according to the invention is a mixture of two components able to form a polyurethane layer, particularly a self-healing polyurethane layer having such surface properties as resistance to scoring and abrasion.

Examples of monomers that are suitable for the preparation of these polyurethanes, on the one hand, are aliphatic difunctional isocyanates such as 1,6-hexanediisocyanate, 2,2,4-trimethyl-1,6-hexanediisocyanate, 2,2,4-trimethyl-1,6-hexanediisocyanate, 1,3-bis-(isocyanatomethyl)benzene, bis(4-isocyanatocyclohexyl)methane, bis(3-methyl-4-isocyanatocyclohexyl)methane, 2,2-bis(4-isocyanatocyclohexyl)propane and 3-isocyanatomethyl-3,5,5-trimethylcyclohexylisocyanate as well as biurets, isocyanurates and prepolymers of these compounds having a functionality of 3 or more and, on the other hand, polyfunctional polyols, such as branched polyols such as polyesterpolyols and polyetherpolyols obtained by reaction of polyfunctional alcohols, particularly 1,2,3-propanetriol (glycerol), 2,2-bis(-hydroxymethyl)-1-propanol(trimethylolethane), 2,2-bis(hydroxymethyl)-1-butanediol(trimethylolpropane), 1,2,4-butanetriol, 1,2,6-hexanetriol, 2,2-bis(hydroxymethyl)-1,3-propanediol (pentaerythritol) and 1,2,3,4,5,6-hexanehexol (sorbitol), with aliphatic diacids, such as malonic acid, succinic acid, glutaric acid, adipic acid, suberic acid and sebacic acid or with cyclic ethers, such as ethylene oxide, 1,2-propylene oxide and tetrahydrofuran, or also polycaprolactone polyols. As the polyol component, it is also possible to use a mixture of at least a long diol such as polyesterdiol or a polyetherdiol with a molecular mass between 500 and 4000, and at least a short diol and, if necessary, at least a polyol with a functionality equal to or greater than three.

When it is desired to obtain a coating layer having improved moisture resistance properties, there can be used as the polyol component a plurifunctional polyol exhibiting ethoxy-propoxy chains, particularly a difunctional polyol comprising 5 to 17% by weight of OH radicals, with an average molecular weight between about 200 and 600 and comprising about 80% by weight of ethoxy radicals in the ethoxy-propoxy chain. This difunctional polyol goes into the polyol-isocyanate mixture at a rate of about 25 to 70% by weight of said mixture. The plurifunctional polyol can also be a polyol with a functionality greater than 2 comprising abut 0.4 to 14% by weight of OH radicals, with an average molecular weight between about 500 and 15,000 and comprising about 50 to 90% by weight of ethoxy radicals in the ethoyx-propoxy chains. This polyol goes into the polyol-isocyanate mixture at a rate of about 30 to 90% by weight of said mixture. The trifunctional polyol is preferably a polyetherpolyol with a base of trimethylolpropane or glycerol or propylene oxide, or a lactonepolyesterpolyol with a base of trimethylolpropane or glycerol or caprolactone. The polyfunctional polyol can also be a tetrafunctional polyol comprising 0.7 to 14% by weight of OH radicals, with an average molecular weight between about 500 and 10,000 and comprising about 10 to 80% by weight of ethoxy radicals in the ethoxy-propoxy chains.

High-speed centrifugal spraying according to the invention makes it possible to obtain a homogeneous reaction mixture from components with very different viscosities. Thus, it is not necessary as indicated above to use solvents which, moreover, are often incompatible with the material of the support to be coated, to compensate for these differences in viscosity. Further, centrifugal spraying provides a layer of homogeneous thickness. It also makes it possible to spray a colored mixture by placing dye in one of the two components or in both of them.

As a variant, the centrifugal spraying can be an electrostatic spraying known in the art, the centrifugal spraying then being performed in an electric field.

The process according to the invention also applies to production of a protective glass with a soft plastic layer exhibiting energy-absorbing properties used, for example, in safety laminated glasses.

These laminated safety glasses, used particularly as vehicle windshields, comprise a transparent rigid support of silicate glass, a plastic layer having energy-absorbing properties (EA layer) and a coating plastic layer having surface properties particularly of resistance to scoring and abrasion, called the inside protective layer (IP layer). These glasses have already been described in several paent publications, for example, in French patent Nos. 2,134,255, 2,398,606, or also in European patent No. 0,054,491. The coating layer having the surface properties used in these laminated glasses is, for example, that described in French patent Nos. 2,187,719 and 2,251,608 already cited. This layer, under normal temperature conditions, has a high elastic deformation capacity, a slight modulus of elasticity, less than 2000 daN/cm$^2$, and preferably less than 200 daN/cm$^2$, and an elongation at break of more than 60% with less than 2% plastic deformation and preferably an elongaion at break of more than 100% with less than 1% plastic deformation. Preferred layers of this type are thermosetting polyurethanes having a modulus of elasticity of about 25 to 200 daN/cm$^2$ and an elongation of about 100 to 200% with less than 1% plastic deformation.

The process according to the invention advantageously applies to the production of the inside protective layer described above by spraying of the suitable reaction mixture on the glass blank already comprising the glass support and the EA layer.

The invention also relates to a device constituting a line for coating the transparent articles of high optical quality by centrifugal spraying of a mixture of polymerizable reaction components on the article to form a protective layer particularly exhibiting surface qualities.

The coating line is divided into several zones: a spraying zone, a zone for polymerization of the material added and, if necessary, a zone for prior thermal or chemical treatment for the article to be coated.

According to the invention, the coating line comprises a conveyer for transfer of the articles to be coated, if necessary, these means being placed in the upstream part of the line, particularly above the conveyer, a spray head revolving at high speed, and a means for polymerizing the formed layer. According to an advantageous embodiment of the device, the entire treatment line is placed in a long enclosure divided into compartments corresponding to the various zones.

The means to prepare the support before spraying can be a heating means for prior heat treatment of the articles to be coated, when plastic articles are involved. These means can be infrared lamps able to heat the products to be coated to a temperature above 100° C.

According to an embodiment of the coating line, the sprayer with the head revolving at high speed is a sprayer with a bowl revolving at a speed that can be between between 1000 and 80,000 rpm. A revolving bowl of this type, described more in detail below, provides a fine homogeneous spray.

According to an embodiment, the treatment line can further comprise a means for cleaning of the articles with a suitable alcohol before heat treatment, if necessary.

To avoid optical flaws in the coating layer due to the presence of foreign bodies, the treatment line can also comprise means preventing grains of dust and other particles from being deposited on the support to be coated, before spraying or on the layer obtained by spraying, and also a cleaning means to eliminate grains of dust possibly deposited.

The means to avoid deposit of undesirable particles can be physical screens. Thus, it is possible to place the entire treatment line, or parts of this line, in one or more enclosures containing filtered, dust-free air. It is also possible to place each article, coated with the sprayed layer, in an individual container, such as a glass box, after spraying.

The means to avoid deposit of particles can also be electrostatic rods which ionize the atmosphere around the article to be coated.

In a variant bringing electrostatic spraying into play, the device comprises a sprayer adapted accordingly.

Other objects, features and advantages of the present invention will be more fully appreciated as the same becomes better understood from the following description according to examples of the device according to the invention when considered in connection with the drawings referred to.

FIG. 1 diagrammatically represents a line for coating glasses with plastic.

Figure 2:
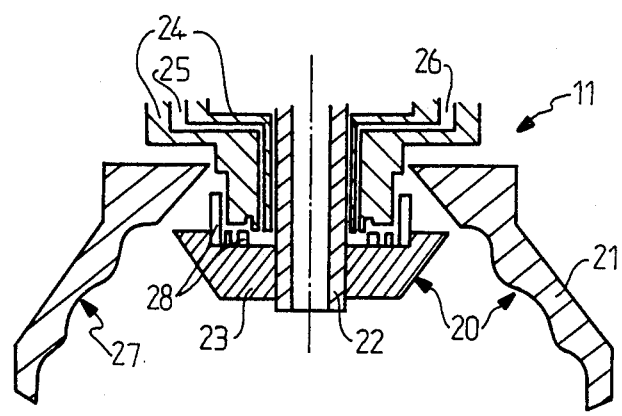
FIG. 2 illustrates, in section, a spray head.

FIG. 2 represents, in section, a spray head.

FIG. 3 diagrammatically represents a line for coating glasses made of glass.

The coating line shown in FIG. 1 is used particularly for coating plastic glasses; it consists of a long enclosure 1 cut into compartments corresponding to the treatment zones, and passed through by a conveyer 2 also made up of several parts for transporting articles 3. The articles are placed horizontally on supports suited for their shape. Upstream part 5 of the conveyer formed by an endless belt transports the articles through compartment 6 corresponding to the prior heat treatment zone. This compartment 6 is equipped with heating means 7 placed perpendicular to the conveyer. The heating means used here are infrared lamps able to bring the articles to a temperature on the order of 80° to 120° C.

An intermediate part 8 of the conveyer transports the articles from heat treatment compartment 6 to compartment 9 corresponding to the spray zone. During this intermediate transport the articles are cooled to reach the temperature necessary for spraying, i.e., between 25° and 60° C. This spray zone is made up of a chamber that is impervious to dust and other particles like the other elements of enclosure 1; this zone is equipped with centrifugal spray means 10 whose head 11 comprises a bowl revolving at high speed, as described below.

Under cable belt 12 forming the part of the conveyer in the spray zone is placed a rank 13 which collects the excess sprayed reaction mixture.

Another intermediate conveyer 14 transfers the coated articles to tunnel 15 corresponding to the polymerization zone. In this zone, the articles transported by the downstream part of the coveyer, also constituted by an endless belt 16, are heated by heating means such as resistors 17 which assure polymerization of coating layer 18 obtained by spraying.

At various places, the treatment line comprises a means to eliminate static electricity in the environment of the articles that are to be coated or have been coated by the sprayed layer. These means can be electrostatic rods 19 known in the art.

The line can also comprise a cleaning means (not shown) to eliminate dust and other particles deposited on the articles to be coated or that have been coated.

Head 11 of the high-speed centrifugal spray device shown in FIG. 2 comprises a mobile part 20 consisting of the revolving bowl 21 itself, solid with a chuck 22 carrying a plate 23, and a stationary part 24 pierced by two feed pipes 25 and 26 for the components, these pipes coming out in the central part of plate 23.

To increase the length of travel for the mixture of the two components introduced by pipes 25 and 26 and also to improve this mixing before spraying, the bowl exhibits, on the one hand, an inside surface 27 whose generatrix is undulated, and plate 23, on the other hand, carries unevennesses or ribs 28 directed upward forming baffles.

FIG. 3 shows a line for coating glasses made of glass. It comprises the same elements as the line described above except the prior treatment compartment is provided, in addition, with a means to coat the support surface with a suitable agent such as an adhesion promoter. These means can be a spray gun 29.

The present invention will now be further illustrated by certain examples and references which are provided for purposes of illustration only and are not intended to limit the same. In particular, the functioning of the devices will now be exemplified in relation to the coating examples consisting of coating glasses of polycarbonate and glass with a layer of thermosetting polyurethane.

EXAMPLE 1

The polymerizable mixture to be sprayed, capable of providing a thermosetting polyurethane layer, is formed from a polyol component and an isocyanate component in the presence of a stabilizer, a catalyst and a spreading agent, taken in the following proportions:

100 g of a polyetherpolyol with a molecular weight of about 450 obtained by condensation of 1,2-propylene oxide with 2,2-bis(hydroxy)-1-butanol and having a free hydroxyl radical content of about 10.5 to 12%.

5.2 g of an ultraviolet stabilizer, 0.05 g of a catalyst, namely, dibutyltin dilaurate and 0.2 g of a fluoroalklyl ester as a spreading agent.

102 g of a 1,6-hexanediisocyanate biuret having a free isocyanate radical content of about 23.2%.

The polyol component exhibits a viscosity of about 620 centipoises at 25° C. while the isocyanate component exhibit a viscosity of about 2300 centipoises. The polyol component is previously mixed with the stabilizer, catalyst and spreading agent.

The rear side windows of polycarbonate previously cleaned with isopropanol are placed horizontally on supports suited to the shape of the windows and particularly hiding their lower face. The conveyer transports articles 3, placed on their support 4, into compartment 6 corresponding to the heat treatment zone, where, by passage under infrared lamps 7, they are brought to a temperature of about 100° C. for 20 minutes. The windows and their support are then brought into spray compartment 9. During the intermediate travel, the temperature of the windows decreases to about 40° C. At the spray station the windows receive a spraying of the reaction mixture described above. Centrifugal spraying is performed when the reaction is at about 25° C., with a bowl revolving at a speed of about 20,000 rpm, the diameter of the bowl being about 90 mm. The supports protect the lower face of the windows from sprayed particles.

Thus, a layer 18 about 50 μm thick is formed. The coated article is then directed into polymerization tunnel 15 where it is subjected to a temperature of 100° C. for 20 minutes.

At the end of the line the coated article exhibits an excellent optical quality. Its resistance to scoring is measured by the test known under the name "Mar resistance test," performed with the Erichsen type 413 apparatus. A measurement is made of the charge to be carried on a diamond head to introduce a sustained scoring on plastic coating layer.

The resistance to scoring here is 20 g, while an uncoated polycarbonate plate exhibits a resistance to scoring of only 2 to 3 g.

Resistance to abrasion of the formed layer is measured per European standard R 43. For this purpose, a sample coated with the protective layer is made to undergo abrasion by an abrasive grinding wheel. After 100 abrasion revolutions, the blur difference between the abraded part and unabraded part is measured with a spectrometer. The blur deviation (blur) should be less than 4% for the layer to have antiabrasive quality.

The abrasion test here give a blur difference of 3.5% after abrasion.

EXAMPLE 2

Plane polycarbonate plates used as building glasses are coated by operating under the same conditions as in Example 1.

Thus, a polyurethane layer 50 μm thick is formed having such surface properties as resistance to scoring and resistance to abrasion.

After polymerization of the layer, the coated plates exhibit an excellent optical quality.

EXAMPLE 3

Plane glasses of glass are coated by using the device described in connection with FIG. 3. For this purpose, the glass support is previously prepared by coating it with an adhesion promoter using a spray gun 29.

The treated supports are brought into spray compartment 9. At the spray station, the glasses receive a spraying of the reaction mixture described in Example 1 under the same operating conditions. Thus a layer 50 μm thick is formed which, after polymerization, constitutes an antishattering film.

EXAMPLE 4

The operation is under the same conditions as in Example 3, except that after formation of the protective layer, a second layer is formed by centrifugal spraying in the same way to increase the overall thickness of the protective film and thereby its antishattering character.

EXAMPLE 5

The operation is under the same conditions as in Example 4, except that a reaction mixture containing, in addition, a suitable coloring agent is sprayed. The resulting coated product exhibits very good optical properties.

EXAMPLE 6

The operation is under the same conditions as in Example 1 to coat polycarbonate headlight units. The resulting coated product exhibits very good optical properties.

EXAMPLE 7

With the process of the invention, a plastic layer 70 μm thick with surface properties is formed on the layer of plastic material 0.6 mm thick with energy-absorbing properties of a glass formed from said plastic layer and a glass sheet 3 mm thick. The reaction mixture that is sprayed being the one described in Example 1.

The resulting glass exhibits a good optical quality and can be used as a safety windshield for a motor vehicle.

EXAMPLE 8

By the process of the invention spraying is performed with a mixture of 100 g a 1,6-hexamethylenediisocyanate biuret having a free NCO radical content of 23% with 164 g of a polyol with a base of ethylene glycol and ethylene oxide/propylene oxide (weight ratio 60/40, statistical distribution), having a free OH radical content of 5.7% and an average molecular weight of about 600 g. 0.07 g of dibutyltin dilaurate is added to the polyol as catalyst.

The support to be coated is a tempered glass sheet able to be used as a rear window of a motor vehicle.

By use of the device described in connection with FIG. 3, a layer 50 μm thick is formed which, after polymerization, exhibits surface properties and, in addition improved moisture resistance.

Having now fully described the present invention, it will be apparent to one of ordinary skill in the art that many changes and modifications can be made thereto without departing from the spirit or scope of the invention as set forth herein.

What is claimed as new and desired to be secured by letters patent of the United States is:

1. A process for coating a transparent plastic article of high optical quality, which consists essentially of spraying a homogeneous polymerizable mixture of reaction components on a transparent plastic article to form a homogeneous coating layer of high optical quality, wherein the reaction components forming the mixture each have a different viscosity and are each supplied to bowl spray head, and the mixture thus formed is directly mixed in the bowl spray head, and wherein the mixture is sprayed by high-speed centrifugal spraying with the spray head revolving at a speed between about 1000 and 80,000 rpm, and polymerizing the resultant layer and wherein a pretreatment of the plastic article to be coated is effected, said pretreatment being a heat treatment comprising maintaining the plastic article at a temperature between about 60° C. and 120° C. for a period of about 10 minutes to about an hour.

2. The process as in claim 1, wherein the reaction mixture which is sprayed forms a polyurethane layer exhibiting such surface properties as resistance to scoring and abrasion.

3. The process as in claim 2, wherein the reaction mixture that is sprayed forms a polyurethane layer exhibiting moisture resistance properties.

4. The process as in claim 2, wherein the polyurethane is a thermosetting polyurethane.

5. The process as in claim 2, wherein the reaction mixture contains a spreading agent.

6. The process as in claim 1, wherein the centrifugal spraying is electrostatic.

7. The process as in claim 1, wherein a reaction mixture is sprayed to form a polyurethane layer exhibiting surface properties on a polyurethane layer exhibiting energy-absorbing properties.

8. The process as in claim 1, wherein the heat treatment is preceded by a washing, with an alcohol, of the surface to be coated.

9. The process as in claim 8, wherein said alcohol is ethanol or isopropanol.

* * * * *